United States Patent [19]
Brüstle et al.

[11] Patent Number: 5,143,026
[45] Date of Patent: Sep. 1, 1992

[54] AIR INDUCTION SYSTEM FOR AN INTERNAL-COMBUSTION ENGINE

[75] Inventors: Claus Brüstle, Heimsheim; Winfried Krebs, Ludwigsburg, both of Fed. Rep. of Germany

[73] Assignee: Dr. Ing. h.c.F. Porsche AG, Fed. Rep. of Germany

[21] Appl. No.: 811,675

[22] Filed: Dec. 23, 1991

[30] Foreign Application Priority Data

Dec. 21, 1990 [DE] Fed. Rep. of Germany ........ 4041200

[51] Int. Cl.[5] ............................................ F02M 35/10
[52] U.S. Cl. .................................................. 123/52 MB
[58] Field of Search ......... 123/52 M, 52 MB, 52 MC, 123/52 MV

[56] References Cited

U.S. PATENT DOCUMENTS 4,590,895  5/1986  Yada et al. .................... 123/52 MB
4,619,226 10/1986  Ueda et al. ..................... 123/52 MC

FOREIGN PATENT DOCUMENTS 3807193  6/1989  Fed. Rep. of Germany ... 123/52 M
3820643 12/1989  Fed. Rep. of Germany ........ 123/52 MV
3820674 12/1989  Fed. Rep. of Germany .
 769041  2/1957  United Kingdom ............. 123/52 M

*Primary Examiner*—David A. Okonsky
*Attorney, Agent, or Firm*—Evenson, Wands, Edwards, Lenahan & McKeown

[57] ABSTRACT

An air induction system has pipe elbows swivellably arranged inside an air collector. As a function of the rotational speed and/or the load, in a first position, the intake path is formed by the intake manifolds and the pipe elbows to be relatively long. In a second position of the pipe elbows, the intake manifolds take air in directly from the air collector.

9 Claims, 4 Drawing Sheets

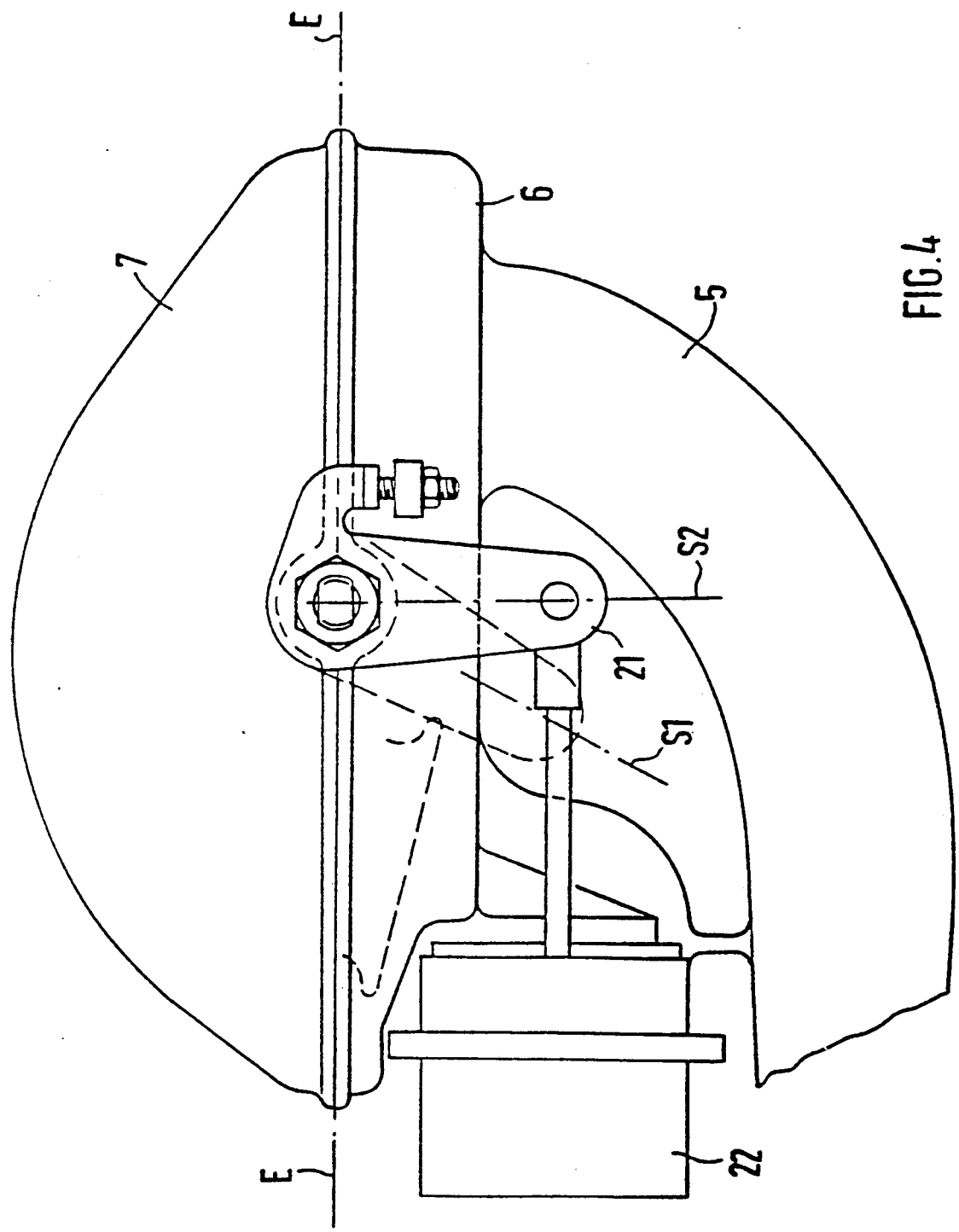

AIR INDUCTION SYSTEM FOR AN INTERNAL-COMBUSTION ENGINE

BACKGROUND OF THE INVENTION

The present invention relates to an air induction system of an internal-combustion engine, and more particularly, to an air induction system for a multi-cylinder engine, having at least one air collector which is connected to individual cylinders of the internal-combustion engine.

German Patent No. DE- 38 20 674 Al shows an air induction system in which the length of individual intake pipes can be varied continuously by the telescope-type moving-in and moving-out of pipe elbows guided in stationary intake manifolds. During a low rotational speed of the internal-combustion engine, these individual intake pipes have their maximal length and their inlet openings rest against an interior wall of a suction distributor which surrounds the pipe elbows. In this position, the suction distributor supplies air to the individual intake pipes by way of a pipe connected thereto. When the rotational speed rises, the pipe elbows are swivelled into the intake manifolds so that the inlet openings lift off the interior wall and the individual intake pipes take in directly from the suction distributor.

It is an object of the present invention to provide an air intake system for an internal-combustion engine in which the length of the pipes, which guide the air to the cylinders, is to be varied in a simple manner, with a required installation space as small as possible and a simple mounting.

This object has been achieved in accordance with the present invention by holding pipe elbows in the air collector openly on a stationary shaft so that they can be swivelled into positions, in one of which one outlet opening of the pipe elbow rests directly on an inlet opening of the intake manifold.

This open arrangement of pipe elbows on a stationary shaft, permits the coupling of the pipe elbows to the intake manifolds by a simple swivel movement by virtue of which the intake path taken by the air is changed. In the first position, an outlet opening of the pipe elbow is disposed directly on an inlet opening of an intake manifold so that the intake path from the air collector to the cylinders of the internal-combustion engine is formed by the series connection of the intake manifolds and the pipe elbows. In a second position, the two openings are arranged at a distance of one another, such that the intake manifolds take in directly from the air collector.

The swivel movement requires little actuating power because the shaft penetrates the bearings assigned to the pipe elbows almost in the mass center of gravity of the pipe elbows; in this case, the pipe elbows only tilt about their center of gravity. The moment of inertia is therefore minimized, and the control element triggering the swivel movement may be dimensioned to be relatively small. The friction to be overcome by the control element is determined only by the friction occurring in the bearing blocks holding the shaft, since the pipe elbows themselves are not disposed in any type of guide bushes with friction.

Vibrations, caused by the induction strokes of the internal-combustion engine, as well as vibrations transmitted by mechanical excitation, have only a slight effect on the pipe elbows. This is because, by virtue of the shaft, the pipe elbows are mechanically coupled to the air collector only at a few points, and this shaft is disposed in a junction plane which carries out only slight tilts about the longitudinal axis of the shaft. Torques are thus not transmitted to the shaft.

The development of the pipes, which can be coupled to the intake manifolds, as pipe elbows, and a lid, which extends closely adjacent to the pipe elbows, permit a small installation space. Together with the above-mentioned advantages, this arrangement has the result that the air induction system can be used on different internalcombustion engines in different installed positions. The junction plane between the housing parts of the air collector, as far as its position with respect to the internal-combustion engine is concerned, may extend horizontally or vertically or in a position which is situated in-between. In addition, this air induction system ma be used on internal-combustion engines with an in-line or a V-shaped cylinder arrangement.

Since the air collector comprises essentially only two housing parts, in the junction plane of which the shaft is held in bearing blocks constructed in one piece with outside walls of these housing parts, a fast and simple mounting and dismounting of this air induction system is possible.

BRIEF DESCRIPTION OF THE DRAWINGS

These and other objects, features and advantages of the present invention will become more apparent from a detailed description of currently preferred embodiments when taken in conjunction with the accompanying drawings wherein:

FIG. 4 is a view in the direction of arrow X in FIG. 2.

DETAILED DESCRIPTION OF THE DRAWINGS

Figure 1:
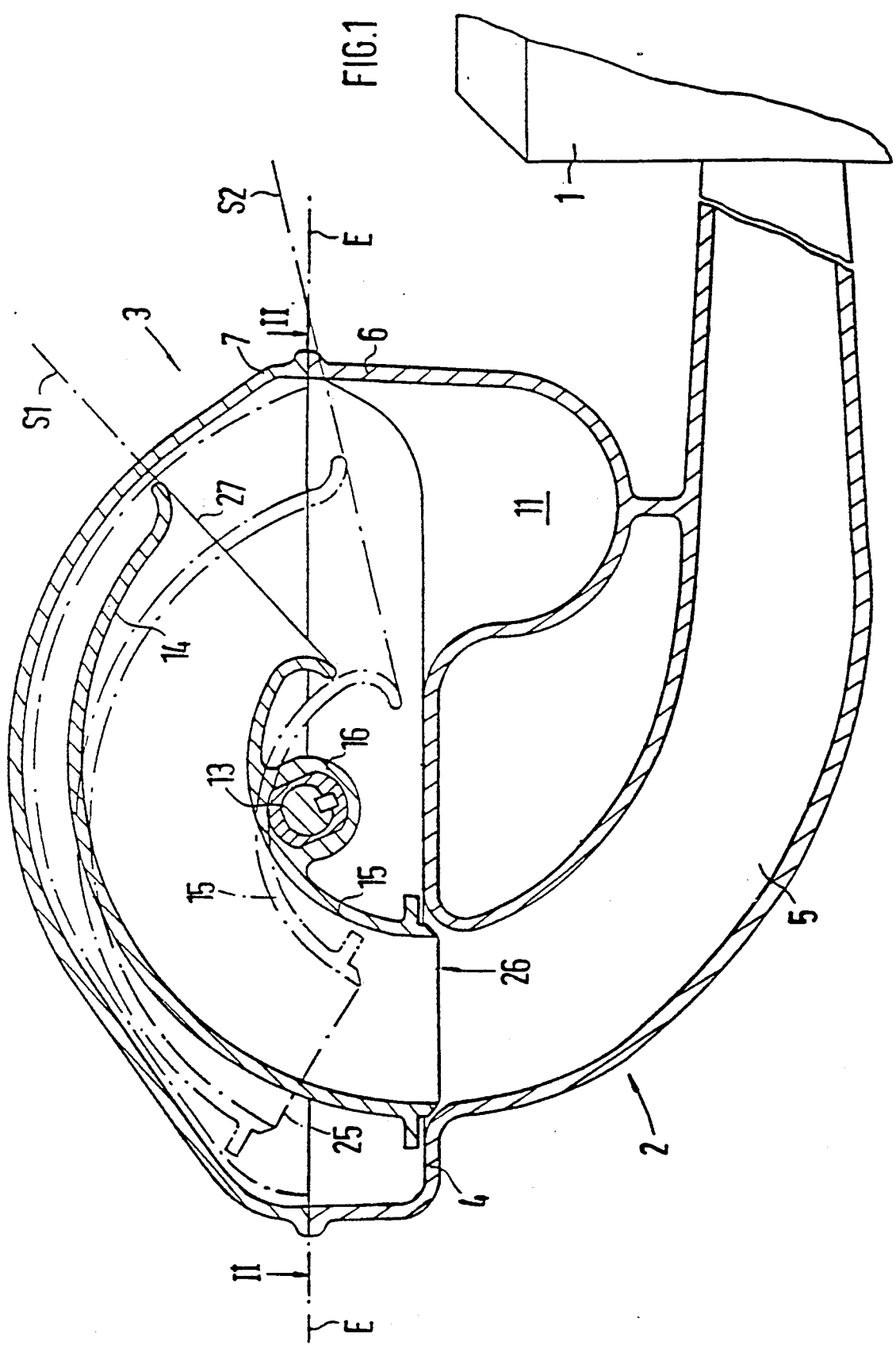
FIG. 1 is a sectional side view of an air induction system of the present invention along Line I—I of hereinbelow described FIG. 2.

Air for the combustion process is fed, via an air induction system 2, to a known multi-cylinder in-line internal-combustion engine which has a cylinder head 1. The air induction system 2 comprises an air collector 3 which, by way of intake manifolds 5 leading into an exterior wall 4, is connected to individual cylinders of the internal-combustion engine. The air collector 3 comprises essentially two housing parts, i.e. a bottom part 6 and a lid 7, with the exterior wall 4 being part of the bottom part 6. Both housing parts 6, 7 are detachably connected with one another in a junction plane E by flange facings 8.

Figure 2:
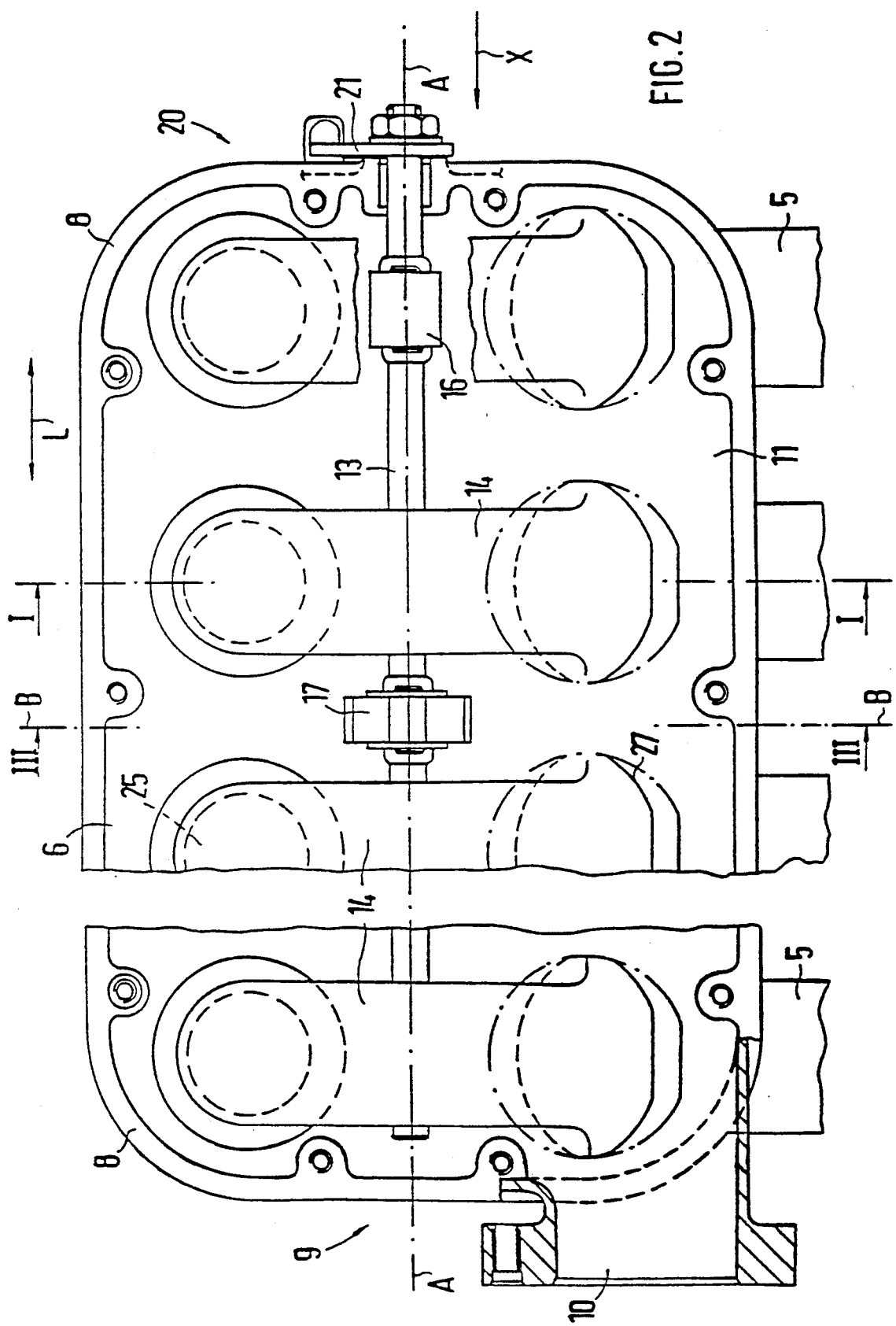
FIG. 2 is a sectional plan view along Line II—II of FIG. 1.

At one end 9 (FIG. 2) of the air induction system 2, an inlet opening 10 is arranged which is connected with an air filter (not shown). This inlet opening 10 is situated on the side of the junction plane E facing the intake manifolds 5 and, inside the bottom part 6, leads into a tub-shaped bulged-out area 11 which is constructed in one piece with the bottom part 6 and extends in a longitudinal direction L.

Figure 3:
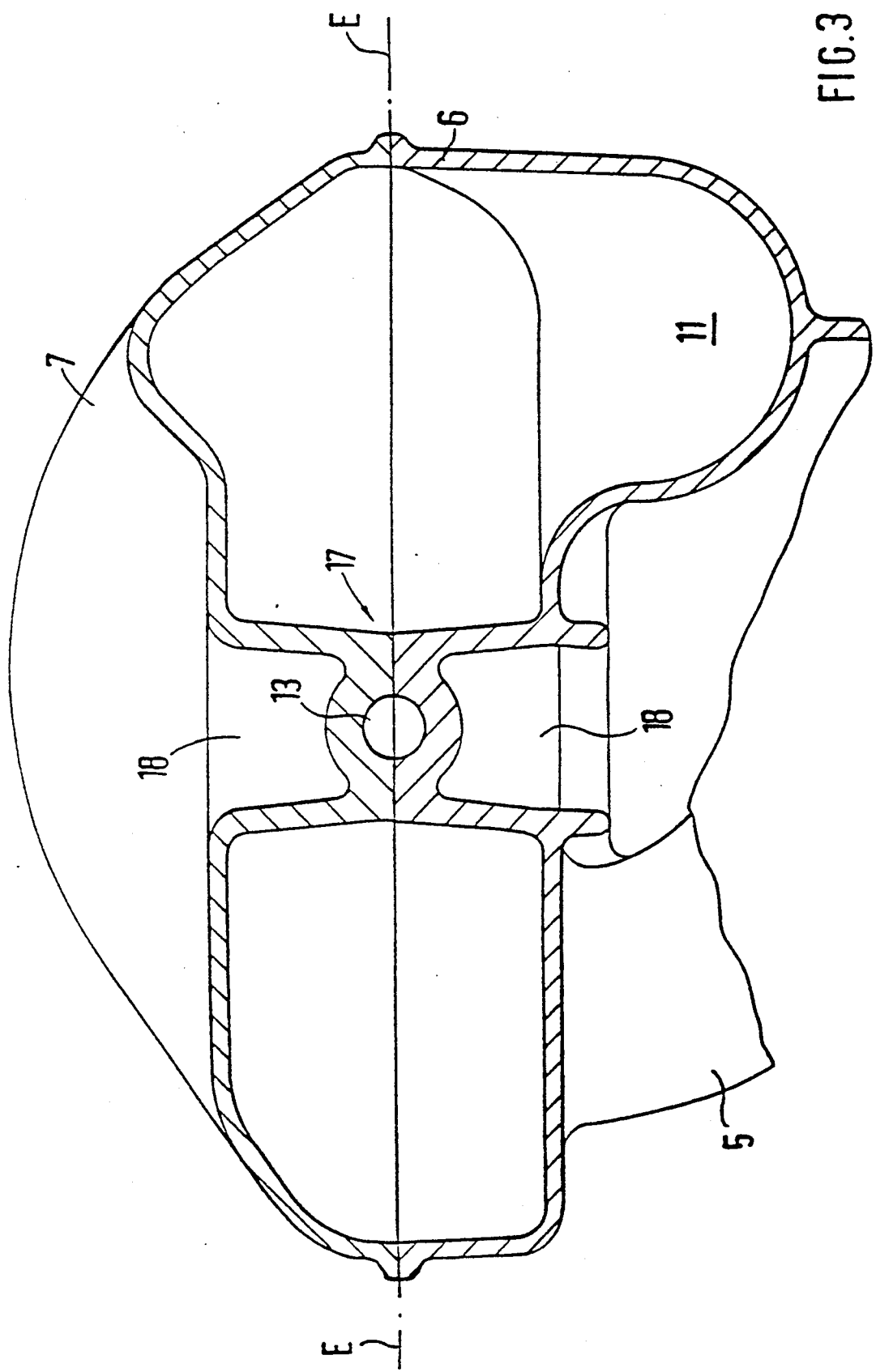
FIG. 3 is a sectional view along Line III—III of FIG. 2.

Inside the air collector 3, a shaft 13 is situated in the junction plane E and is rotatably held about its longitudinal axis A. Pipe elbows 14 are fastened on this shaft 13 by bearings 16 arranged directly on an pipe elbow wall 15. The shaft 13 is supported in bearing blocks 17 which are arranged in planes B extending vertically with respect to the junction plane E and the longitudinal axis A between the pipe elbows 14. These bearing blocks 17, according to FIG. 3, are formed by indentations 18 extending from the outer walls of the housing parts to the junction plane E. On the side 20 (FIG. 2) situated opposite the end 9, the shaft 13 extends out of the air collector 3 and is provided with a non-rotatable lever 21. An actuating element, which is constructed as a pressure cell 22 and which is held on the bottom part 6, is operatively connected to this lever 21.

During the operation of the internal-combustion engine with a low load and/or rotational speed, the lever 21 and therefore also the pipe elbows 14 are swivelled into a first position S1 shown in full line in FIG. 1. In this situation, an outlet opening 25 of the pipe elbows 14 rests directly against an inlet opening 26 of an intake manifold 5. The intake air is guided from the direction of the inlet opening 10 along the bulged-out area 11 into the air collector 3 and, by way of inlet cross-sections 27, enters into the pipe elbows 14. The length of the intake path formed of the intake manifolds 5 and the pipe elbows 14 is so large that a good charging of the internal-combustion engine is achieved in this rotational speed range.

When the internal-combustion engine reaches a certain rotational speed, for example, 4,000 l/min., the pressure cell 22 swivels the lever 21, and the pipe elbows 14 therefore tilt into a second position S2 shown in dot-dash line in FIG. 1. The outlet opening 25 is now situated away from the inlet opening 26, and the intake air arrives in the intake manifolds 5 directly from the air collector 3. This shortened intake path achieves a charge that is good for this rotational speed range and therefore optimizes the course of the torque.

When it is used on an internal-combustion engine with a V-shaped cylinder arrangement, the air collector 2 may be arranged almost in the center between the cylinder banks. In this situation, respective adjacent intake manifolds 5 lead to the first or the second cylinder bank. In yet another embodiment, the bottom part 6 may have two bulgedout areas 11 extending in parallel to one another to which intake manifolds 5 are connected which cross one another and which lead to one cylinder bank, respectively. Here, two parallel or coaxially arranged shafts 13 are provided which are each swivelled by either one actuating element or a common actuating element. Then, one shaft 13, with the pipe elbows arranged on it, is assigned to a cylinder bank.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An air induction system for a multi-cylinder internal-combustion engine, comprising at least one air collector, intake manifolds leading into an outer wall and connecting the at least one air collector to individual cylinders of the internal-combustion engine, pipe elbows operatively arranged inside the air collector, such that the pipe elbows in the air collector are held openly on a shaft operatively arranged to be swivelled into multiple positions, wherein in one of the positions, one outlet opening of each pipe elbow rests directly on an inlet opening of the intake manifold.

2. The air induction system according to claim 1, wherein, in another of the positions, the outlet opening is arranged at a distance from the inlet opening.

3. The air induction system according to claim 1, wherein the air collector has a junction plane in which a longitudinal axis of the shaft is situated.

4. The air induction system according to claim 3, wherein the pipe elbows are held on the shaft by bearings arranged directly on a wall of the pipe elbows.

5. The air induction system according to claim 3, wherein the shaft is held in bearing blocks which border on the junction plane and are arranged in planes extending vertically to the junction plane and to a longitudinal axis between adjacent ones of the pipe elbows.

6. The air induction system according to claim 5, wherein the bearing blocks are indentations extending from the outer walls of the air collector to the junction plane.

7. The air induction system according to claim 3, wherein the air collector comprises housing parts which border on the junction plane through flange facings.

8. The air induction system according to claim 7, wherein one of the housing parts is a lid which extends directly adjacent the pipe elbows.

9. The air induction system according to claim 1, wherein the pipe elbows at least partially enclose the shaft.

* * * * *